United States Patent [19]
Landi

[11] Patent Number: 5,137,769
[45] Date of Patent: Aug. 11, 1992

[54] VIBRATION DAMPENING MEANS FOR STRUNG OR SPOKED EQUIPMENT

[75] Inventor: Curtis L. Landi, Mountain View, Calif.

[73] Assignee: Supracor Systems, Inc., Sunnyvale, Calif.

[21] Appl. No.: 625,503

[22] Filed: Dec. 11, 1990

[51] Int. Cl.$^5$ ............................................. B32B 3/12
[52] U.S. Cl. ...................................... 428/116; 428/72; 428/118; 273/73 C; 273/73 D; 273/73 F; 273/73 G; 273/73 J; 273/81 R
[58] Field of Search .................. 273/73 C, 73 D, 73 F, 273/73 H, 73 J, 75, 81 R, 67 A, 73 K; 428/116, 118, 71, 72, 73, 37

[56] References Cited

U.S. PATENT DOCUMENTS

| | | | |
|---|---|---|---|
| 3,837,991 | 9/1974 | Evans | 428/116 |
| 4,180,265 | 12/1979 | Staufer | 273/73 D |
| 4,575,083 | 3/1986 | Adam | 273/73 D |
| 4,609,194 | 9/1982 | Krent | 273/73 D |
| 4,761,007 | 8/1988 | Boschian | 273/73 D |
| 4,927,143 | 5/1990 | Hillock | 273/73 D |

FOREIGN PATENT DOCUMENTS 2135588  9/1984  United Kingdom ............ 273/73 D

*Primary Examiner*—Ellis P. Robinson
*Assistant Examiner*—Nasser Ahmad
*Attorney, Agent, or Firm*—Rosemblum, Parish & Issacs

[57] ABSTRACT

Means for dampening vibrations in a strung game racket or a spoked wheel comprising a block of flexible, thermoplastic elastomer honeycomb bonded to and sandwiched between two thermoplastic facings. The device is inserted between at least two strings of the interwoven string diaphragm of the racket, or two spokes in a spoked wheel arrangement, in such a manner as to allow the exposed honeycomb core at the sides of the device to wrap around the engaged strings or spokes and hold the device in place. The device absorbs vibrations in the strings that originate from the striking surface when a ball is struck, and vibrations in the spokes emanating from normal use of a wheel.

10 Claims, 5 Drawing Sheets

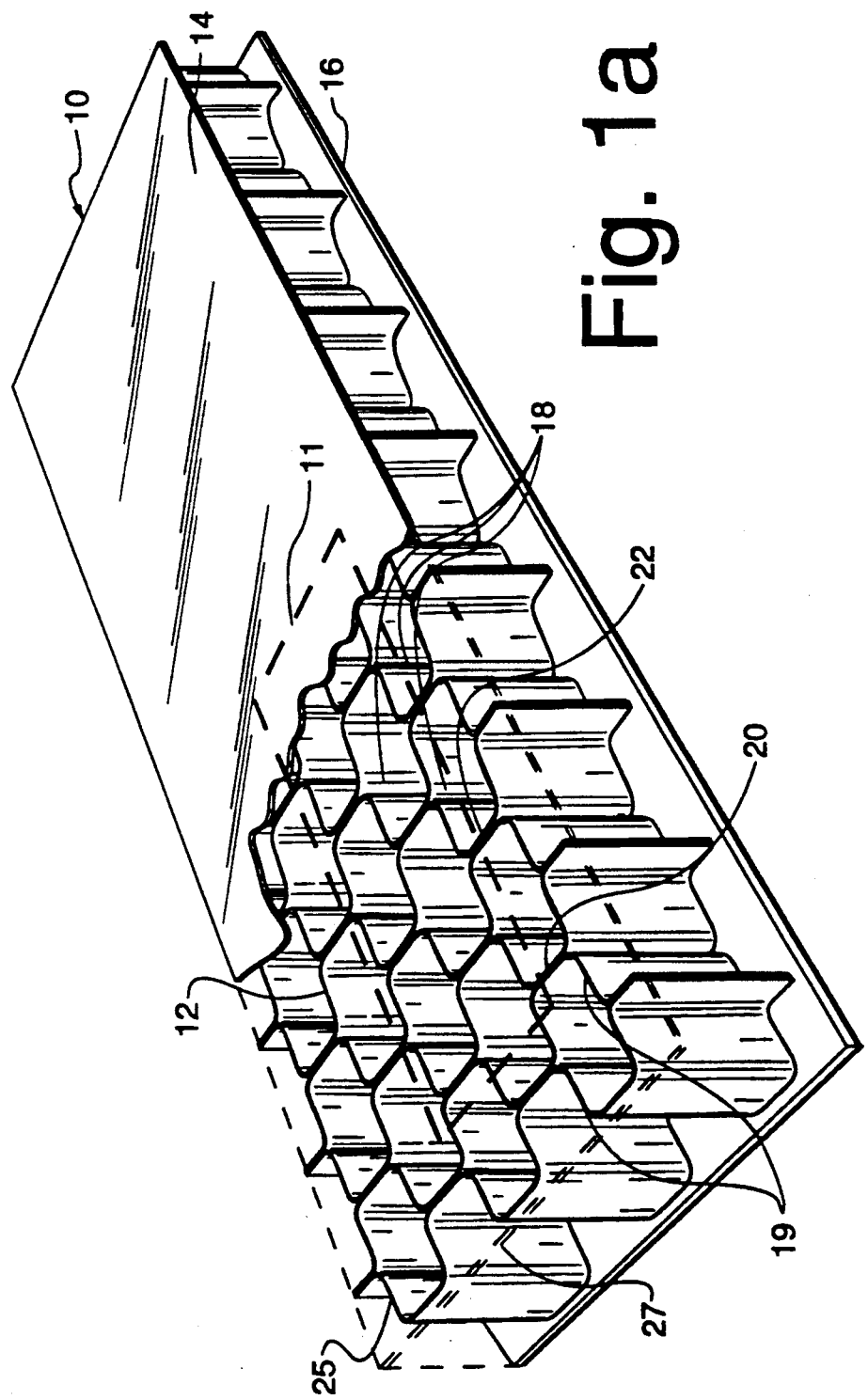

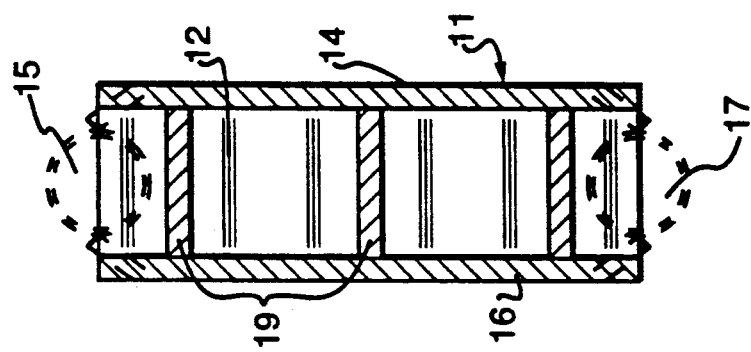
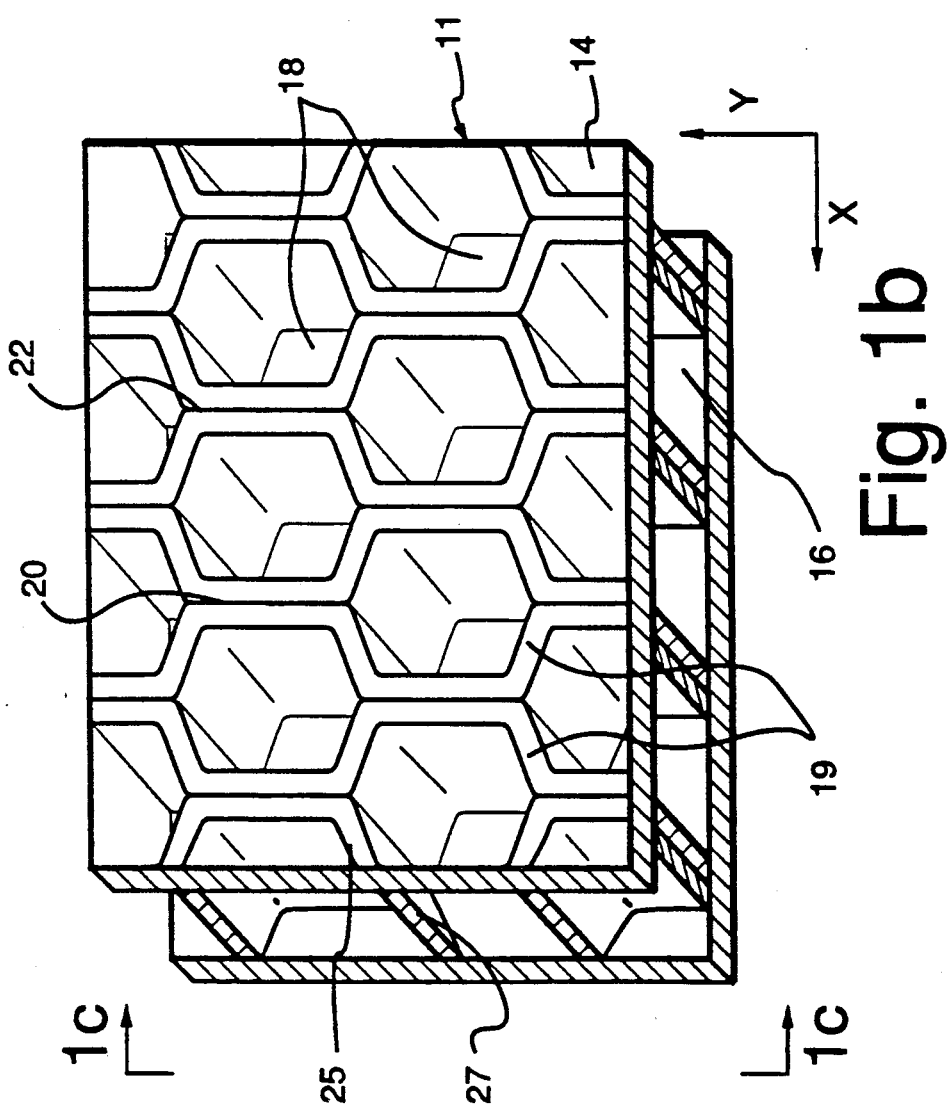

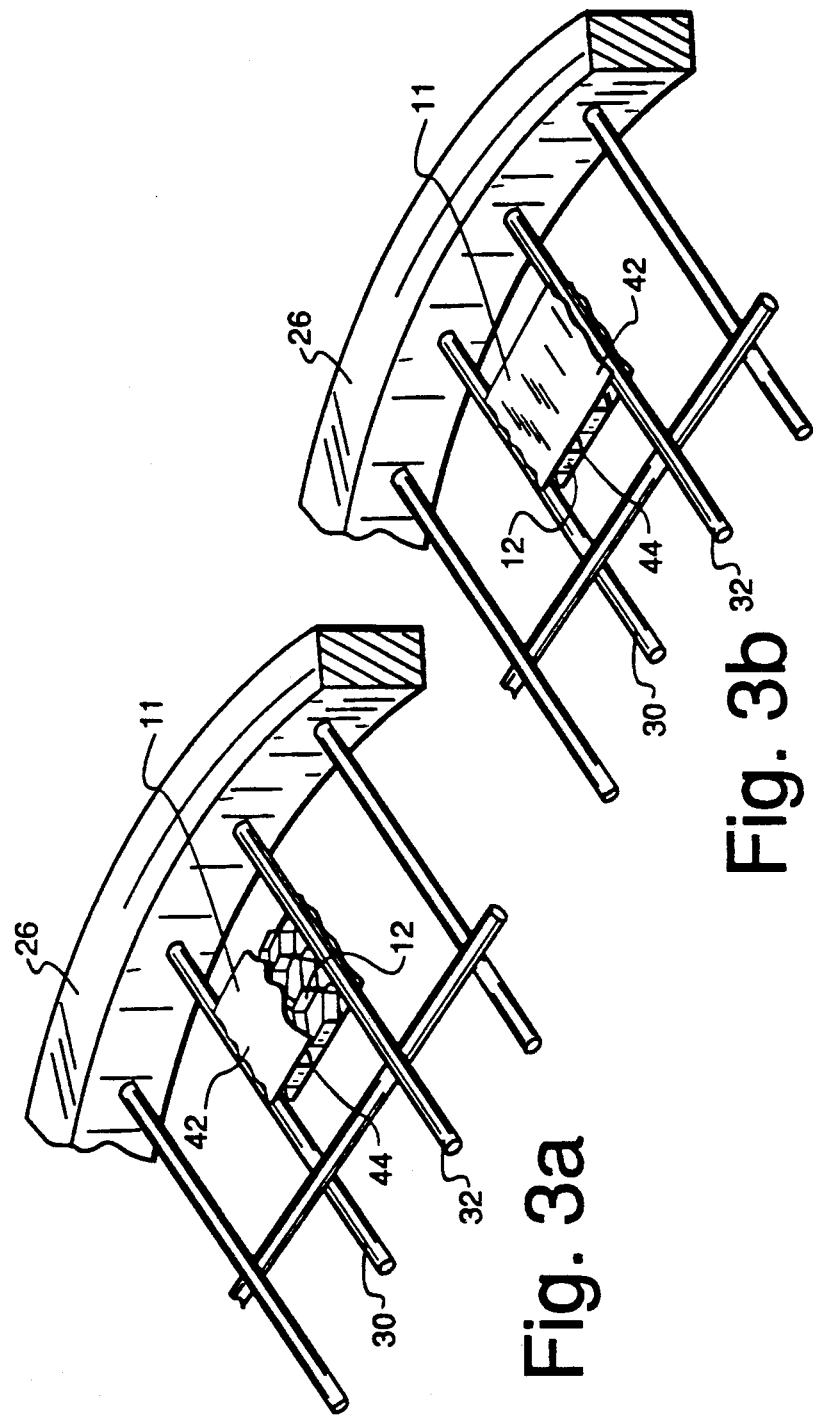

VIBRATION DAMPENING MEANS FOR STRUNG OR SPOKED EQUIPMENT

BACKGROUND OF THE INVENTION

1. Field of the Invention

This invention relates generally to devices for dampening vibration, and more particularly to a device that, when inserted between a set of strings of a game racket, will dampen the vibrations experienced by the strings (and the player) when the strings contact a game ball. Additionally, the device may be inserted between the spokes of a bicycle wheel such that vibrations experienced by the wheel during use will be dampened before reaching the frame of the bicycle.

2. Brief Description of the Prior Art

In strung, hand held game rackets, vibrations are produced when the player causes the racket to strike a ball. These vibrations begin in the area of the interwoven string diaphragm where the ball is struck (the striking surface), radiate outwardly through the string network to the frame of the racket, and then on to the hand and arm of the player. Exposure to vibrations over a long period of time can cause injury to the player's hand, wrist and arm. To avoid this type of injury, it is desirable to reduce such string vibrations before they reach the racket frame.

Early efforts to dampen vibrations were directed to the racket's construction. Carbon and graphite racket frames replaced the traditional wood frames, and the shape of the racket frame was experimentally modified. Yet none of these changes amply reduced the vibrations felt by the player. Natural catgut used for the racket's strings was found to produce lower levels of vibration than plastic strings, but players preferred the higher performance plastic strings which, unfortunately, produce a higher level of vibration.

After the early efforts to reconstruct the racket had failed, inventors created shock absorbing inserts to be placed between a set of strings for dampening vibrations. The vibration dampening inserts in the prior art recognized that mechanically coupling or mechanically isolating a set of strings by inserting a vibration absorbing material between them, resulted in a dampening of the vibrations that flow through the strings when the striking surface of the racket hits a ball.

U.S. Pat. No. 4,180,265 involves a dampening device that couples two parallel strings or one longitudinal string and one transverse string together. The length of the device is smaller than the distance between the strings, causing the distance between the strings to be slightly reduced at the dampening device. The vibration from the strings is dampened because the coupled strings are detuned relative to each other and also because the elastomeric material that the device is made from has inherent viscoelastic dampening properties. This type of device is usually an integral part of a racket. Therefore, it must be woven into the string diaphragm at the time the racket is manufactured.

Converse to the mechanical couple, U.S. Pat. No. 4,609,194 illustrates a vibration dampening device that, when inserted between a set of strings within a racket frame, mechanically isolates the strings and absorbs the vibrations flowing through the string diaphragm when a ball is hit. This is achieved by inserting a compressed block of viscoelastic foam between two parallel longitudinal strings and at least one adjacent transverse string, and then releasing the foam block, allowing it to expand to its natural shape. The expanded foam presses outwardly on the engaged strings urging them away from one another, thus mechanically isolating them. When vibration is produced in the striking surface of the racket, the foam from which the device is made absorbs the vibrations and turns the mechanical vibrational energy into heat energy which is dissipated.

After insertion, the foam block expands in all directions where it is unrestrained by the racket strings. The majority of the foam expands in a direction generally normal to the direction of the strings, causing an interruption in the flat plane of the racket face that is created by the interwoven string diaphragm. When a player swings the racket and hits a ball at the point on the interwoven string diaphragm where this type of device is inserted, the device will interfere with the normal travel of the ball and misdirect the struck ball, thereby hampering the player's skill. Additionally, these foam devices are rapidly destroyed under normal wear and tear.

The spokes of a bicycle wheel experience vibrations during use similar to the vibrating strings of a game racket. The spoke vibrations from the front wheels are transmitted to the front forks of the bicycle frame and then on to the main frame of the bicycle. These vibrations affect the rider's arms as they continue through the frame onto the handlebars. Further, the vibrations from the rear wheel passes through the rear forks to the seat of the bicycle causing the rider further discomfort.

SUMMARY OF THE INVENTION

It is therefore an objective of the present invention to provide vibration dampening means for a strung game racket comprising a device having block of flexible, thermoplastic elastomer honeycomb as its core and two sheets of resilient facing bonded thereto.

Another objective of the present invention is to provide superior vibration dampening means for a strung game racket by placing a block of flexible honeycomb between two parallel strings of the racket's interwoven string diaphragm.

Briefly, a preferred embodiment of the present invention includes a device comprising a block of flexible, thermoplastic elastomer honeycomb bonded to and disposed between two thermoplastic facings. The core of the device is made from a plurality of advanced grade, thermoplastic elastomeric sheets that form a honeycomb-like network of cells.

While the core is held in an expanded disposition, resilient thermoplastic facings are fusion bonded to each surface. The addition of the facings encapsulates air within each cell. Thus, the preferred embodiment of a device of the present invention has a flexible honeycomb core sandwiched between facings on the upper and lower surfaces of the core. Since the facings are only on the upper and lower surfaces, the core is exposed at the sides of the device.

To dampen string vibration, the device is usually inserted into the area between two parallel longitudinal strings, the first transverse string and the racket frame, such that the facings of the device are parallel to the plane of the interwoven string diaphragm of the racket. Because the device is slightly larger than the area between two parallel strings, the flexible cell material wraps around the two parallel strings and holds the device in place. Alternatively, or in addition, the device may be inserted at any point or points around the racket frame. Further, the device can be placed between the strings so that the sheets of thermoplastic material are disposed in a horizontal direction along the plane of the interwoven string diaphragm, or the device may be installed so that the sheets are disposed ninety degrees thereto, in a vertical direction.

An important advantage of the present invention is that the device is made of thermoplastic and thermoplastic elastomeric materials which absorb energy.

Another advantage of the present invention is that the device has exceptional spring-back recovery characteristics due in part to the materials used in its construction and in part to the encapsulated air.

A further advantage of the present invention is that the device is highly durable and will not degrade with repeated impact.

Yet another advantage of the present invention is that the facings of the device are flat and thus will not interfere with the flight of a struck ball.

A still further advantage of the present invention is that the thermoplastic material used in making the device, the use of encapsulated air and the addition of perforations in the facing material in an alternative embodiment all contribute to the light weight of the device.

These and other objects and advantages of the present invention will no doubt become apparent to those skilled in the art after having read the following detailed description of the preferred embodiment which is contained in and illustrated by the various drawing figures.

IN THE DRAWING

FIG. 1a is a perspective view of a honeycomb structure from which a vibration dampening device in accordance with the present invention may be severed, with the top facing partially broken away to better illustrate the honeycomb core.

FIG. 1b is a perspective view showing the severed dampening device.

FIG. 1c is an elevational view showing the dampening device of FIG. 1b as viewed from along the line 1c–1c of FIG. 1b.

FIGS. 3a and 3b are enlarged, partially broken perspective views of a game racket showing how the device of the present invention holds itself in place between the strings of a game racket.

DETAILED DESCRIPTION OF THE PREFERRED EMBODIMENT

Figure 2B:
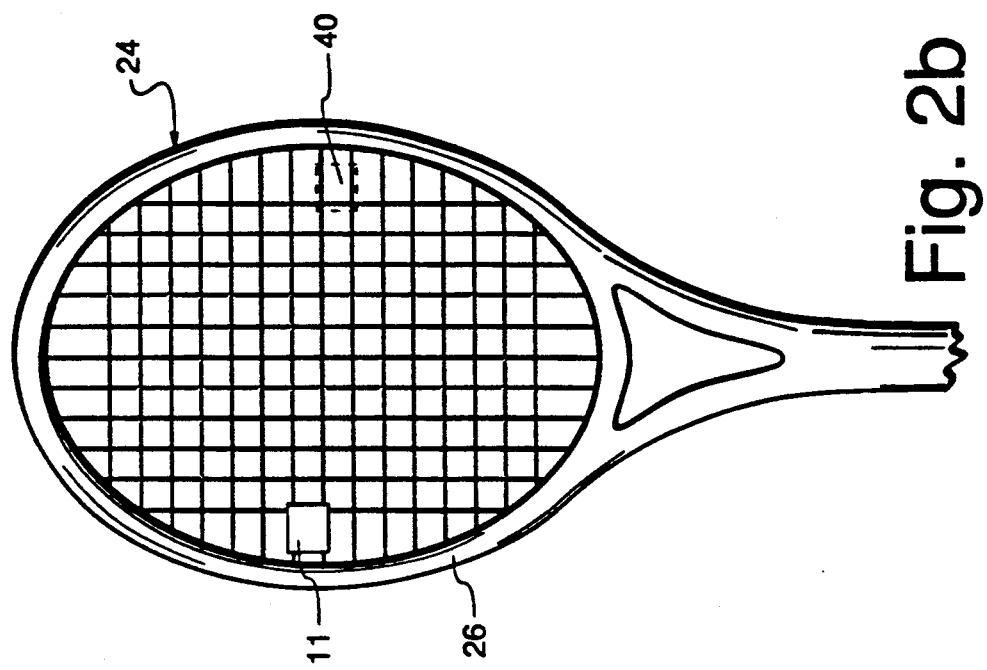
FIGS. 2a and 2b illustrate the preferred areas of placement of the present invention on the interwoven string diaphragm of a game racket.

FIG. 1a illustrates a preferred embodiment of a vibration dampening device 10 in accordance with the present invention. The stock 10 that the device 11 is cut from includes a block of honeycomb-structured core 12 made of vibration absorbing thermoplastic material that is bonded to and sandwiched between two thermoplastic facings 14 and 16.

The honeycomb core 12 is made from sheets of an advanced grade thermoplastic elastomeric material that are compression bonded together at intermittently spaced intervals staggered between alternate sheets. This pattern of bonding creates a honeycomb network of elongated, generally hexagonally shaped cells when the bonded stack of sheets is expanded.

Each cell 18 of the honeycomb core 12 is defined by four generally S-shaped wall segments, each of which is shared by an adjacent cell. The wall segments of each cell 18 include single thickness wall portions 19 and double thickness wall portions 20 and 22, the latter portions being disposed on each side of the cell where the side wall of one cell is compression bonded to the side wall of an immediately adjacent cell.

The upper and lower extremities of the walls forming the several cells are deformed during a planarization operation disclosed in our copending U.S. patent application Ser. No. 07/446,320 (now U.S. Pat. No. 5,039,567) filed Dec. 4, 1989 and create upper and lower surfaces 25 and 27 of the honeycomb core. Facings 14 and 16, made from a resilient thermoplastic material, are then compression bonded to the top and bottom surfaces 25 and 27 while the core is held in an expanded configuration. The addition of the facings encapsulates air within each cell and enhances the device's spring-back characteristics. The device's superior shock absorption characteristics result in part from the use of thermoplastic (or thermoplastic elastomeric materials) for both the honeycomb core 12 and the facings 14 and 16. In addition to their shook absorption qualities, these materials are tear resistant and highly resilient, yet extremely light weight so that the balance of the racket face is not affected by the insertion of one or more devices between the strings of a game racket.

FIG. 1b illustrates a device 11 in accordance with the present invention that has been severed from the honeycomb structure of FIG. 1a. The device 11 is cut from the stock 10 in a pattern that will expose the walls of the cut cells at the sides of the device. In other words, when a cut is made in a direction normal to the direction of the double thickness wall portions 20 and 22 (the x direction in FIG. 1b), it is made along the midline of each cell 18. Similarly, when a cut is made parallel to the direction of the double thickness wall portions 20 and 22 (the y direction in FIG. 1b), severance is made through the cell 18 on either side of the double thickness wall portions, between the side of the cell 18 and the midline of the cell 18.

FIG. 1c is a side view of the device 11 illustrated in FIG. 1b, taken along the line 1c–1c of FIG. 1b, and showing how the device 11 conforms to the cylindrical shape of a string 15 and 17 when inserted in place in a game racket. The width of the device 11 is slightly larger than the distance between the two parallel strings 15 and 17 so that, when the device 11 is inserted between the strings, the strings squeeze the sides of the device 11. The exposed flexible honeycomb core 12 at the sides of the device will buckle and conform to the shape of the strings 15 and 17. The dashed lines in FIG. 1c show how the side walls buckle around a string 15 and 17, forcing the facings 14 and 16 to bend toward each other. The buckled walls and facings grip the string and aid in holding the device 11 in place.

The vibration absorbing effectiveness of the device 11 is most prominent when the device 11 is placed at the extreme top, bottom or either side of the racket face, between the racket frame and first string of the interwoven string diaphragm. Within these quadrants, the device 11 would be inserted between two parallel strings that are woven in a direction perpendicular to a first string. FIG. 2a illustrates the head of a racket 24 with a device 11 inserted at the bottom of the racket face between the frame 26 and the first laterally extending string 28 and between the two centermost longitudinally extending strings 30 and 32 running perpendicular to the string 28. An alternative placement of the device is illustrated in dashed lines 34 at the top of the racket face between two parallel strings 36 and 38 that are not the two centermost strings.

Figure 2A:
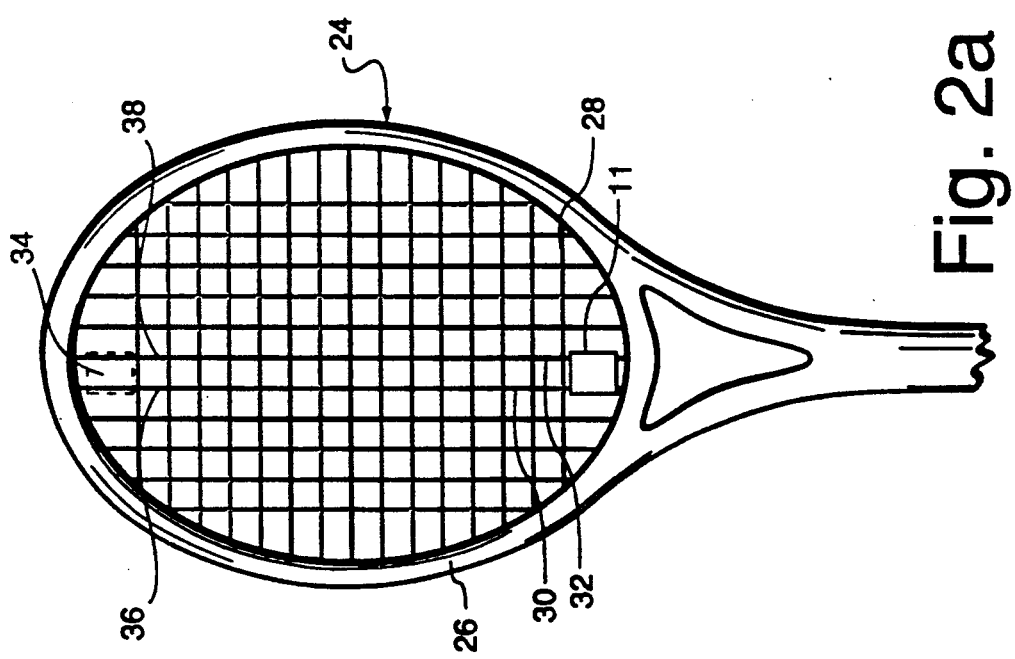

Similarly, FIG. 2b shows a racket head 24 with the device 11 of the present invention placed in the area to the left side of the racket face. Additionally, an alternately positioned device at the right side of the racket face is shown by the dashed lines 40. Multiple devices can be used, if the player desires, and can be placed in any suitable combination as illustrated in FIGS. 2a and 2b.

FIGS. 3a and 3b are elongated views showing a device 11 inserted between the frame 26 and the interwoven string diaphragm of a game racket. In FIG. 3a, the top facing 42 of the device is shown partially broken away to better illustrate how the walls of the cells along the sides of the device conform to the two parallel strings 30 and 32 to hold the device 11 in place. Note that the facings 42 and 44 cover the top and bottom surfaces of the honeycomb core 12, but along the sides of the device 11, the flexible honeycomb core 12 is exposed. When the device 11 is inserted between two parallel strings 30 and 32 of the racket, the strings slightly squeeze the device 11 at its sides because the width of the device is a bit larger than the separation between the strings. As a result of this squeezing, the open cell walls at the sides of the device 11 conform to the cylindrical shape of the strings and generally wrap around portions of the strings.

FIG. 3b illustrates the same device 11 as that in FIG. 3a without the facing broken away. Because the facings 42 and 44 of the device 11 are fusion bonded to the top and bottom of the honeycomb core, the facing edges along the sides of the device that interface with the strings will be slightly deformed toward each other when the device in inserted between the strings. The facings are pulled inwardly because the cell walls of the honeycomb core buckle and wrap around the string. This is shown in FIG. 3b by the gathers in the facing along the engaging edges of the device 11.

Alternately, the device may be inserted in such a way as to engage not only the two parallel strings, but also the first transverse string from the frame of the racket. Additional vibration reduction may be experienced with this disposition.

The rectangular shape of the device described thus far is for purposes of illustration only. A device in accordance with the present invention can be of any configuration, including but not limited to square, circular, or octagonal.

Figure 4:
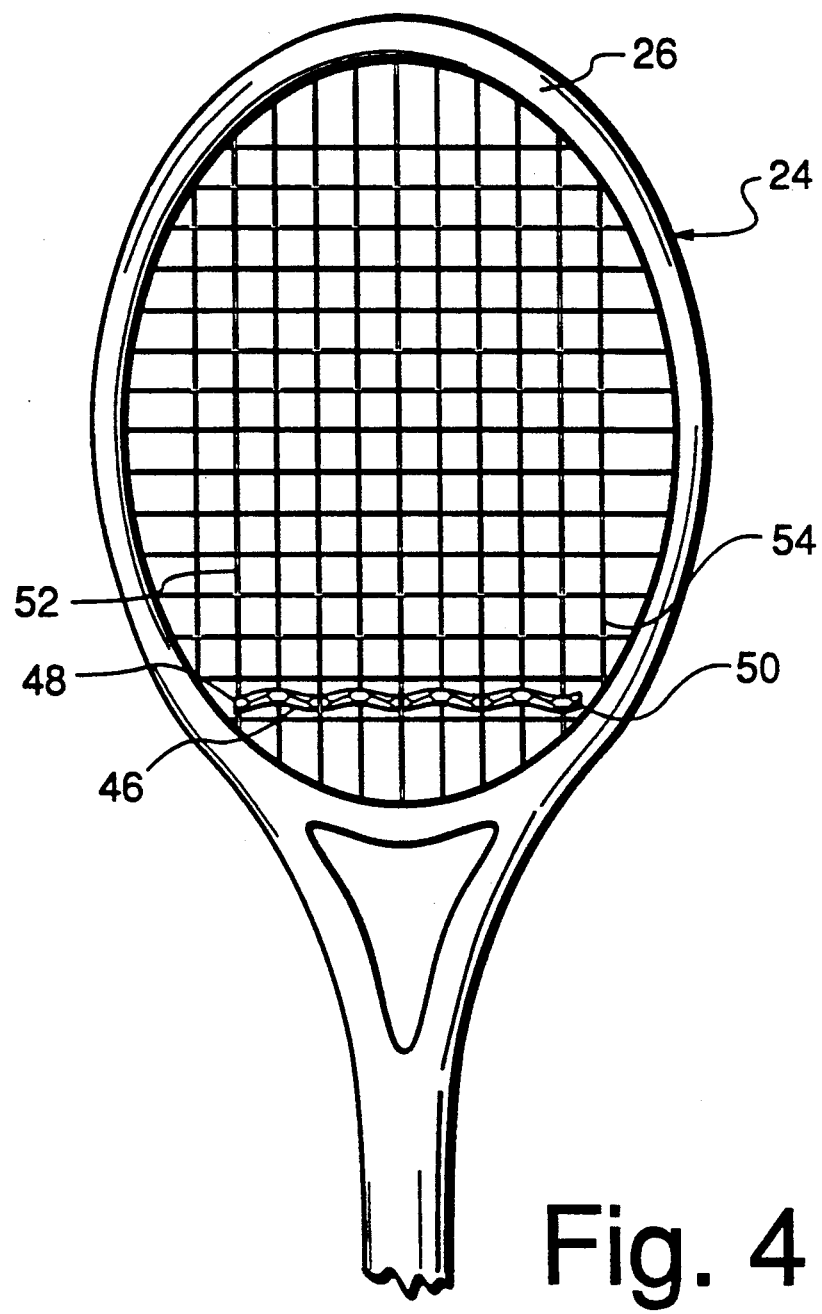
FIG. 4 illustrates how a strip of flexible honeycomb may be placed between the strings of tennis racket.

An alternate embodiment of the present invention provides an example of use of a differently shaped piece of flexible honeycomb. FIG. 4 shows how a thin strip 46 of flexible honeycomb can be woven through a section of the string diaphragm of a tennis racket to dampen string vibrations. The strip 46 is held in place in the same manner as the block of honeycomb previously illustrated in the preferred embodiment. The exposed walls of the cut cells at the sides 48 and 50 buckle and conform to the shape of the strings 52 and 54 that are engaged by the strip 46.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. Tear resistant, light weight vibration dampening means having a width larger than the distance between two parallel rigid members of strung or spoked equipment and severed from a body of material comprising:
   a flexible thermoplastic elastomeric core made from strips of resilient thermoplastic elastomeric sheet material bonded together to from the walls of a honeycomb network of generally hexagonally shaped cells, said strips of material forming double thickness walls at the locations where said strips are bonded together, the walls of said cells each having upper edges and lower edges; and
   first and second sheets of resilient thermoplastic elastomeric and flat facing material, thermal compression bonded to the upper and lower surfaces of said core formed by said upper and lower edges, hermetically sealed to encapsulate air in said cells;
   wherein said dampening means is severed from said body of material such that the severance along at least two sides is made normal to said double thickness walls and proximate the midpoint of the intersected double thickness walls to expose the edges of the walls of each cell through which a severance is made, creating a plurality of outwardly extending vertical ribs intermittently spaced around the perimeter of said vibration dampening means.

2. Vibration dampening means as recited in claim 1 wherein severance along at least two sides is made parallel to and non-intersecting said double thickness walls, such that severance along all sides maximizes the exposure of said vertical ribs.

3. Vibration dampening means as recited in claim 2 wherein said plurality of vertical ribs are collapsible around a rigid member when said rigid member is pressed against said ribs in a direction normal to said vertical ribs.

4. Vibration dampening means as recited in claim 3 wherein each sheet of said facing material bends toward the other at the intersection of said facing with said vertical ribs when said rigid member is pressed against said ribs causing said vertical ribs to collapse.

5. Vibration dampening means as recited in claim 1 wherein said core material is a resilient thermoplastic elastomer of a first thickness and said facing material is a resilient thermoplastic elastomer of a second thickness greater than said first thickness.

6. Vibration dampening means as recited in claim 1 or 4 wherein said rigid member is a first and second string of an interwoven string diaphragm on a game racket.

7. Vibration dampening means as recited in claim 6 wherein said first and second string are parallel to each other and in line.

8. Vibration dampening means as recited in claim 7 wherein said dampening means also interfaces with a third string, disposed perpendicular to said first and second parallel strings.

9. Vibration dampening means as recited in claim 8 wherein said dampening means also interfaces with a fourth string, parallel to said third string.

10. Vibration dampening means as recited in claim 1 or 4 wherein said rigid member is a first and second spoke of a bicycle wheel.

* * * * *